Sept. 2, 1969   HIDEYA SATOH   3,464,394
ROTARY PISTON INTERNAL COMBUSTION ENGINE
Filed Nov. 8, 1967

INVENTOR
HIDEYA SATOH
BY *Wenderoth, Lind & Ponack*
ATTORNEYS

United States Patent Office 3,464,394
Patented Sept. 2, 1969

3,464,394
ROTARY PISTON INTERNAL COMBUSTION
ENGINE
Hideya Satoh, Hiroshima-shi, Japan, assignor to Toyo
Kogyo Company Limited, Hiroshima-ken, Japan
Filed Nov. 8, 1967, Ser. No. 681,507
Claims priority, application Japan, Nov. 9, 1966,
41/103,335
Int. Cl. F02b 53/04, 55/14
U.S. Cl. 123—8
4 Claims

ABSTRACT OF THE DISCLOSURE

A rotary piston internal combustion engine having a fresh air pouring port opening to the working chamber under the exhaust stroke in the end wall of the housing for clarification of the exhausting burnt gases by oxidizing carbon monoxide and hydrocarbon contained in the exhausting gases.

---

The present invention relates to a new and improved rotary piston internal combustion engine which combines the exhaust of combustion products with the introduction of fresh air into the working chamber under the exhaust stroke for the clarification of the exhausting burnt gases.

In general, rotary piston internal combustion engines comprise a housing formed by a peripheral wall interconnected by a pair of parallel end walls thereby defining a cavity whose peripheral shape preferably is basically an epitrochoid. A rotatably mounted rotary piston is supported on a shaft within the cavity, the outer surface of which defines a plurality of circumferentially-spaced apex portions each having a radially movable apex seal thereon for the sealing engagement with the inner surface of the peripheral wall thereby forming a plurality of working chambers which upon rotation of the rotor vary in volume. An intake port is provided for admitting a fuel-air mixture to the intake chamber for the next compression and power strokes of the engine. An exhaust port is provided for expelling burnt gases from the engine and an ignition means may be provided for igniting the fuel-air mixture whereby the strokes of intake, compression, combustion, expansion and exhaust will be carried out.

A lubrication system is provided for lubricating the engine shaft and bearings and includes means for supplying lubricating oil to the interior of the rotary piston for cooling purposes. For the purpose of blocking of the leakage of such lubricating and cooling oil to the working chambers, an annular seal ring substantially concentric to the said rotor on each end face of the rotor is provided for sealing engagement with adjacent end wall inner face of the housing. A side seal strip is provided radially outwardly spaced from the said annular seal ring and extending between each pair of the apex portions of the rotary piston for sealingly defining working chambers by sealing engagement thereof with adjacent end wall inner face.

An object of the present invention is to provide a novel and improved engine of the type hereinabove described wherein the fresh air is pumped or drawn into the working chamber responsive to the exhaust stroke to clarify the exhausting burnt gases by oxidizing carbon monoxide and hydrocarbon contained in the said gases.

Another object of the present invention is to provide a novel and improved rotary piston internal combustion engine in which the directing of the fresh air into the working chamber responsive to the exhaust stroke is permitted to start by passage of the side seal over a fresh air intake port in the end wall of the housing.

A further object of the invention is to provide a novel and improved rotary piston internal combustion engine in which the introduction of fresh air into the exhaust-stroke-chamber is permitted to start with predetermined timing so as to perform the clarification of the exhausting burnt gases efficiently.

A further object of the invention is to provide a rotary piston internal combustion engine which has provision for introducing the fresh air for the clarification of the exhausting gases by means of a pump operatively connected to the fresh air inlet port in the end wall of the housing of the engine of the type hereinbefore described.

A still further object of the present invention is to provide a rotary piston internal combustion engine in which the fresh air inlet port is closed before the fresh gas intake stroke starts so as to prevent the overlapping of the intake of said fresh air and intake of the fresh gas and air mixture.

Another and further objects and advantages of the invention will become apparent on reading the following description in connection with the accompanying drawings, in which.

Figure 1:
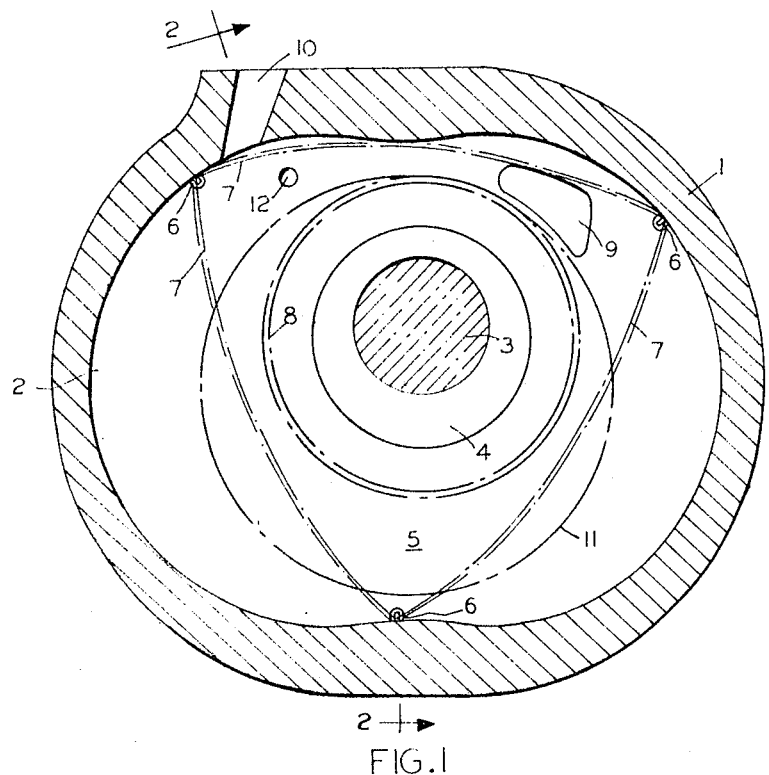
FIGURE 1 is a schematic, transverse, sectional view of a rotary piston internal combustion engine according to the present invention.

Referring to the drawings, the housing is composed of an annular center wall 1 and axially spaced end walls 2 closing the annular wall 1 to form a cavity therein. The internal surface of the annular wall 1 is preferably of basically epitrochoidal profile, and coaxially extending through the cavity defined by the annular wall 1 and the end walls 2 is a shaft 3 rotatably journaled in a main bearing bore in each end wall 2. Said shaft 3 has an eccentric portion 4 upon which a multi-apexed rotary piston 5, having one more apex than number of lobes of the epi-trochoid of the profile of the center wall inner face, is rotatably mounted. The rotary piston 5 has in the embodiment of the present invention an average triangular profile in out line as shown in FIGURE 1 and has an axially extending apex seal 6 on each apex portion thereof. Each of the apex seals 6 is radially movable for continuously sealing engagement with the inner surface of the annular wall.

Provided adjacent the radial outermost edge of the opposite end faces of the rotary piston 5 and extending between each pair of the apex seals 6 are side seal strips 7 which prevent, in combination with the apex seals 6, the leakage of gases from the working chambers when the rotary piston 5 planetarily rotates. Concentric to the rotary piston 5 and provided radially inwardly spaced from the side seal strips 7 on each end face of the rotary piston 5 is an oil seal ring 8 adapted for blocking leakage of the lubricating cooling oil to the working chambers. Designated with reference numeral 9 is an intake port provided in at least one of the end walls 2 for admitting the fuel-air mixture into the working chamber under the intake stroke. Spaced from the intake port 9 and provided preferably in the annular wall 1 is an exhaust port 10 for permitting expelling burnt gases during operation of the engine. Described with dotted line and being eccentric to the oil seal ring 8 is a delimiting circle 11 along which the radial outermost edge of the oil seal ring 8 traces upon planetary motion of the rotary piston.

Opening through the end wall 2 is a fresh air inlet port 12 for admitting fresh air into the working chamber under the exhaust stroke for the purpose of clarification of the exhausting burnt gases as hereinafter described. It is desirable that before the fresh air inlet port 12 is closed by the rotary piston 5, the radial outer edge of the gas intake port 9 is radially inwardly positioned from the radially innermost edge of the side seal strip 7 for prevention of overlapping of the fresh air inlet with the fresh gas intake and injecting the fresh air into the fuel air mixture intake chamber. The radially inner edge of the intake port 9 is also disposed, as well known in similar types of engines so that the radial innermost edge of the oil seal ring 8 does not pass beyond the said intake port inner edge in order to preclude the flow of lubricating and cooling oil into the working chamber.

The fresh air inlet port 12 is seen to be radially inwardly spaced from the said side seal strip 7 when the rotary piston 5 is positioned as shown in FIGURE 1, and said air outlet port 12 also must be radially outwardly spaced from the oil seal ring path 11 in order to preclude the flow of lubricating and cool oil into the port 12.

A spark plug means (not shown) for igniting compressed fuel-air mixture may be conventionally provided, and thereby the strokes of intake, compression, combustion, expansion and exhaust are performed. The exhausting of the burnt gases is performed by well known means of passing the apex seal 6 portion over the exhaust port opening 7 by the action of the planetary motion of the rotary piston 5.

After the exhaust port 10 opens and the exhaust stroke commences for exhausting the burnt gases, the port 12 is then opened to the working chamber and fresh air is permitted to flow into the exhaust chamber in response to the starting of the lowering of the pressure in the exhaust chamber, thereby carbon-monoxide and hydrocarbon contained in the exhausting gases are oxidized by the fresh air so that the combustion products exhausted through the exhaust port 10 are clarified substantially before or simultaneously with the exhausting stroke.

Figure 2:
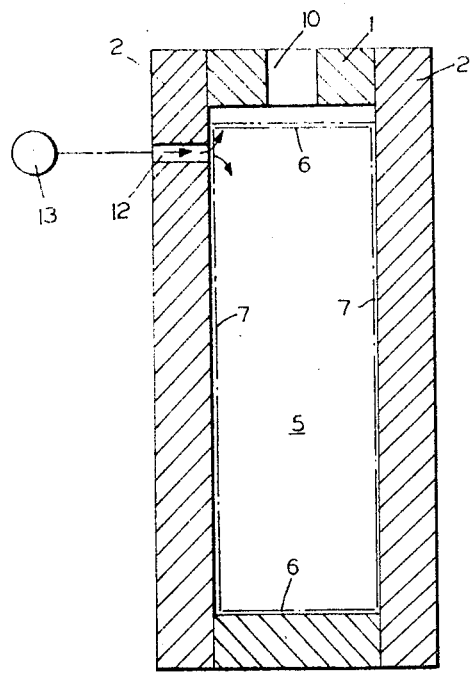
FIGURE 2 is a sectional view taken along the line 2—2 of FIGURE 1, and showing the rotary piston schematically.

The introduction of the fresh air into the exhaust chamber may be done by means of any suitable air source, for instance, by an air pump 13 operatively connected to the air inlet port 12 as shown in FIGURE 2, whereby fresh air is admitted into the exhausting chamber as soon as the port 12 is opened to the exhausting chamber by passing of the side seal 7 over the air inlet port opening 12. The timing of the inlet of the fresh air may be desirably modulated so as to obtain effective clarification of the exhausting gases by desirably selecting the positioning of the port 12, and it will be obvious that the position of the port 12 at least permitting the penetration of the fresh air into the working chamber simultaneously with the starting of the burnt gas exhausting is desirable A part of the fresh air introduced into the exhaust chamber occupies the preceding corner of the chamber under the exhaust stroke, and with the progress of the planetary motion of the rotary piston 5, the said fresh air proceeds to occupy the whole working chamber defined by the working surface of the rotary piston 5 and the annular wall 1, which chamber is at the substantially final stage of the exhaust stroke and/or at the substantially initial stage of the next intake stroke, and in the chamber between the exhaust port 10 and the fuel mixture intake port 9 the fresh air zone is formed. The said fresh air zone in the working chamber blocks the burnt gases in the exhaust chamber from flowing into the intake stroke part. It will be obvious that by optionally selecting the positioning of the fresh air intake port 12 so that the port 12 is closed by passing the side seal strip 7 over the said port 12 before the fuel intake stroke takes place, then the penetration of the fresh air from the port 12 into the chamber under the intake stroke, by the effect of the different pressure between adjacent two parts of the chamber, is eliminated. Thereby dilution of the fuel-air mixture is avoided and the deterioration of the engine performance due to such defect is avoided.

What is claimed is:

1. A rotary piston internal combustion engine comprising a housing composed of an annual center wall (1) and axially spaced end walls (2) closing opposite ends of said annular center wall to form a cavity therein; and intake port (9) opening through said housing for admitting the fuel-air mixture; and exhaust port (10) opening through said housing for expelling the burnt gases; a shaft (3) axially extending through said cavity, rotatably journaled in a bearing bore in each end wall (2) and having an eccentric portion (4) thereon; a rotary piston (5) rotatably mounted on said eccentric portion (4) in said cavity; said rotary piston (5) having a peripheral surface with a plurality of circumferentially spaced apex portions and opposite end faces; an apex seal (6) on each apex portion; a side seal strip (7) on each end face extending between a pair of said apex seals (6); an oil seal ring (8) radially inwardly spaced from said side seal strip (7) on each end face; said apex seal (6), said side seal strip (7) and said oil seal ring (8) being in sealing engagement with said housing to define a plurality of working chambers which vary in volume and perform the strokes of intake, compression, combustion, expansion and exhaust with the planetary rotation of said rotary piston; a fresh air inlet port (12) connected with an air source (13) opening in said end walls (2) of the housing; and said fresh air inlet port (12) being opened to the working chamber by passing of said side seal strip (7) over said fresh air inlet port (12) for admitting the fresh air into said working chamber responsive to the exhaust stroke.

2. A rotary piston internal combustion endgine as defined in claim 1 wherein the fresh air inlet port (12) is also closed responsive to the exhaust stroke by the passing of said side strip (7) over said fresh air inlet port (12) before said fuel-air mixture intake port (9) is opened in accordance with the planetary rotation of said rotary piston (5).

3. A rotary piston internal combustion engine as defined in claim 2 in which said fuel-air mixture intake port (9) opens through a said end wall (2) of the housing.

4. A rotary piston internal combustion engine as defined in claim 2 in which said fresh air inlet port (12) is positioned radially outwardly spaced from a delimiting circle (11) along which the radial outermost edge of said oil seal ring (8) traces, in order to preclude lubricating oil from flowing into said fresh air inlet port (12).

References Cited
UNITED STATES PATENTS

| | | |
|---|---|---|
| 3,103,920 | 9/1963 | Georges. |
| 3,323,497 | 6/1967 | Paschke _____ 230—145 XR |
| 3,360,191 | 12/1967 | Yamamoto _____ 230—145 |

CORNELIUS J. HUSAR, Primary Examiner

U.S. Cl. X.R.

230—145